Dec. 15, 1959 K. H. BAIGENT 2,916,769
INJECTION MOULDING MACHINES
Filed July 23, 1957 7 Sheets-Sheet 1

FIG. 1.

INVENTOR
KEITH H. BAIGENT

BY Holcombe, Wetherill & Brisebois
ATTORNEYS

Dec. 15, 1959   K. H. BAIGENT   2,916,769
INJECTION MOULDING MACHINES
Filed July 23, 1957   7 Sheets-Sheet 2

INVENTOR
KEITH H. BAIGENT

BY Holcombe, Wetherill & Brisebois
ATTORNEYS

Dec. 15, 1959  K. H. BAIGENT  2,916,769
INJECTION MOULDING MACHINES
Filed July 23, 1957  7 Sheets-Sheet 4

FIG. 5.

INVENTOR
KEITH H. BAIGENT

BY Holcombe, Wethrill & Brinsbee
ATTORNEYS

Dec. 15, 1959     K. H. BAIGENT     2,916,769
INJECTION MOULDING MACHINES Filed July 23, 1957                         7 Sheets-Sheet 5

INVENTOR
KEITH H. BAIGENT

BY Holcombe, Wetherill & Brisebois
ATTORNEYS

INVENTOR
KEITH H. BAIGENT
BY
Holcombe, Wetherill & Brisebois
ATTORNEYS

Dec. 15, 1959 K. H. BAIGENT 2,916,769
INJECTION MOULDING MACHINES
Filed July 23, 1957 7 Sheets-Sheet 7

INVENTOR
Keith H. Baigent
BY
ATTORNEYS

United States Patent Office 2,916,769
Patented Dec. 15, 1959

2,916,769

INJECTION MOULDING MACHINES

Keith Herbert Baigent, Surrey, England, assignor to R. H. Windsor Limited, Chessington, Surrey, England Application July 23, 1957, Serial No. 674,007

Claims priority, application Great Britain June 5, 1953

7 Claims. (Cl. 18—30)

This invention relates to injection moulding machines and more particularly to a pre-plasticising injection unit for such machines, and is a continuation-in-part of my co-pending application Serial No. 433,780, filed June 1, 1954, now abandoned.

The known forms of pre-plasticising injection moulding machines are provided with two-stage injection units which comprise a heated pre-plasticising cylinder into which thermoplastic material is fed in powder or granular form. The powder or granular material is rendered plastic in said heated plasticising cylinder and when injected into an injection cylinder, for example by an hydraulically operated piston. The plastic material is then finally ejected from said cylinder through an injection nozzle into a mould for moulding the final product. The ejection of the material from the injection cylinder into the mould is effected, for example, by an hydraulically operated piston operating within said injection cylinder.

The object of the present invention is to provide an improved form of pre-plasticising injection unit which has a higher efficiency than the known two-stage type of unit and consequently also considerably reduces the overall cost in manufacturing moulded articles. Thus in accordance with the present invention a single stage pre-plasticising unit is provided in which the material is rendered plastic, compressed and finally injected directly into the mould from a single cylinder or chamber thus eliminating the necessity of providing a pre-plasticising cylinder and a separate compression and injection cylinder as in the known pre-plasticising injection moulding machines.

This invention consists of an injection moulding machine comprising an injection chamber or barrel, means for heating said chamber or barrel, a screw conveyor comprising two or more conveyor screws rotatable in the same direction and slidable longitudinally within said chamber or barrel so as to serve not only as a plasticiser but as an injection ram as well, a slidably mounted motor unit for rotatably driving said conveyor screws through suitable gearing and a hydraulically operated piston rod for slidably moving said screw conveyor in said injection chamber or barrel, said screw conveyor, motor unit and piston rod being operatively interconnected and slidable as a whole.

It has proven, as a practical matter, impossible to use a single screw as both an injection ram and a mixer or plasticiser, since when a single screw is translated forward to force the plastic material through the nozzle, a substantial portion thereof tends to flow backward between the threads of the screw. Since the cross-sectional area of the space between the threads is ordinarily much larger than that of the nozzle, in order to provide a desired pressure at the nozzle, it is consequently necessary to build up in the injection chamber.

This problem I have solved by using specially designed intermeshing twin screws. These screws are so designed that at their output ends the threads on each screw block the space between the threads of the cooperating screw in the plane which includes the axes of the two screws. Since a number of the threads at the output end are made in this manner and the thermoplastic material is quite viscous, a very effective seal against back flow is secured. Some clearance between the threads of two screws in this section and between the screws and injection chamber, is of course necessary, as in all machines.

When subjected to injection pressure any of this viscous material flowing backward between the threads must flow at right angles to the force applied in a figure-eight path, first about one screw and then about the other, through the plurality of successive constrictions occurring where the space between the threads of each screw are blocked by the threads of the cooperating screw. In my commercial machine each thread of the outlet section occupies about 99% of the space between the adjacent threads on the mating screw in the plane of their axes.

While a machine provided with twin screws having intermeshing threads uniform in dimensions from one end of the screws to the other would probably be operative for some purposes, the commonly used thermoplastic materials have "compression ratios," that is to say, their volume when plasticised is substantially smaller than their volume when in a granular condition ready to be fed to the plasticiser. Consequently, if the threads of the screws are uniform from one end to the other, the input section will not accept as large a volume of material as the output section can handle. If on the other hand, the available volume at the input end is made larger at the input end than at the output end, fewer mixing rotations are required between injections to fill the output section and a more efficient and faster machine results.

This was recognized by Colombo, who in U.S. Patent No. 2,563,396 describes a screw-type extrusion machine with intermeshing screws in which the root diameters of successive sections of the screws is successively reduced. This, however, entails an off-setting change in the outer diameter of the threads and the inner diameter of the casing wall. As a consequence, Colombo's screws cannot be used as injection pistons, since they cannot be reciprocated due to the different diameters of the different sections.

I have consequently devised screws in which the volume available between the threads or "swept volume" is greater at the input than at the outlet end, but the outer diameters of the threads are uniform, so that the screws may be reciprocated.

This arrangement allows for the optimum acceptance of material fed into the screws, and also allows a controlled amount of backflow near the input end, so that the interlocked output section, which acts as a meter, will not be forced to accept material under very high pressures. This also reduces the amount of power required to rotate the screws. The mixing and compounding action of the screws is not materially affected by this controlled backflow which ensures that the material entering the interlocked output section is fully plasticised, thoroughly mixed, and of uniform temperature.

The result is an efficient screw type plasticiser which can be reciprocate to serve as an effective injection ram.

In order that the invention may be more clearly understood one particular embodiment thereof will now be described, by way of example, with reference to the accompanying drawings wherein.

Figure 1:
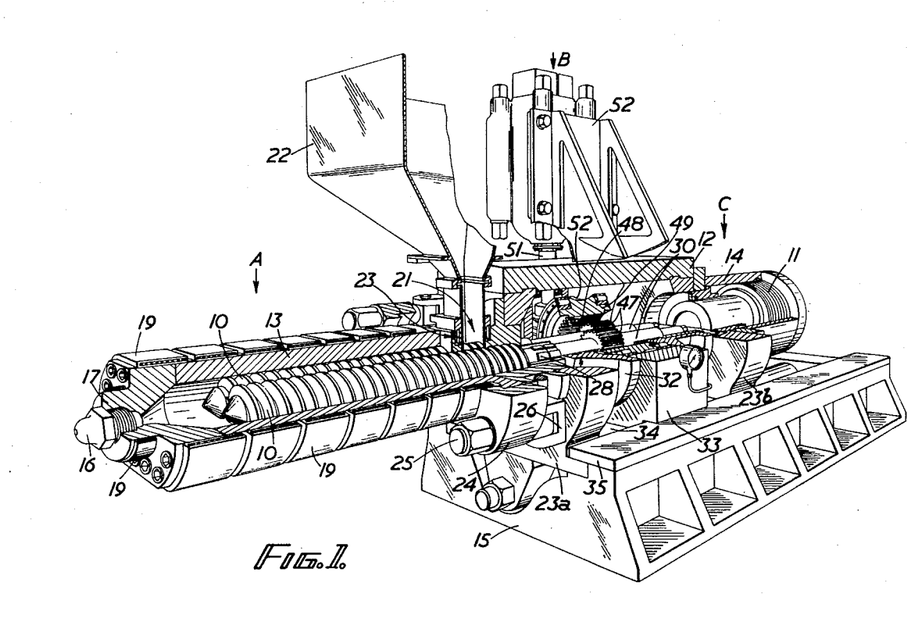
Figure 1 is a perspective view, partly in section, of an injection moulding machine according to the invention.

Referring to Figure 1 of these drawings the injection moulding machine comprises generally an injection chamber unit, shown generally at A, comprising a twin-screw conveyor which is coupled through suitable gearing to an hydraulic motor unit, shown generally at B, and an hydraulic piston assembly shown generally at C. The twin-screw conveyor 10, the motor unit and the hydraulically operated piston 11 are in alignment and are slidable as a whole relative to the injection chamber 13, a frame structure 12 in which the motor unit is mounted, and the cylinder 14 of the hydraulic piston 11 respectively. The injection chamber, the frame structure carrying the motor unit and the cylinder of the hydraulic piston are all rigidly mounted on a base 15.

Figure 2:
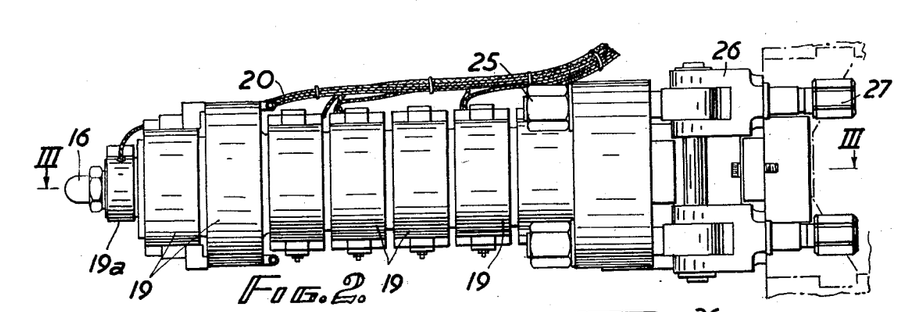
Figure 2 is a side elevation of the injection chamber of the machine.
Figure 3:
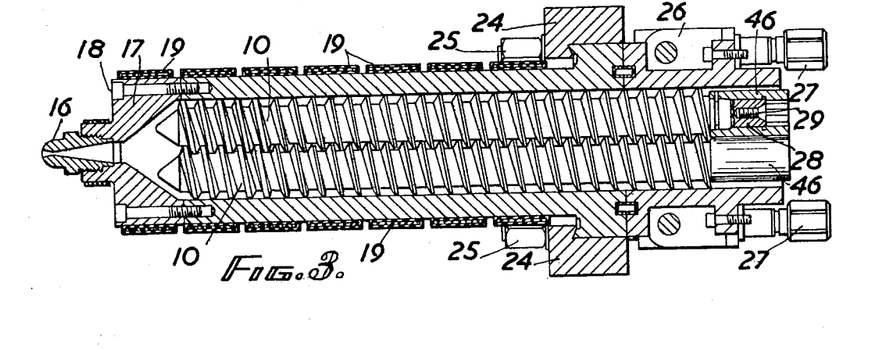
Figure 3 is a section on the line III—III of Figure 2.
Figure 10:
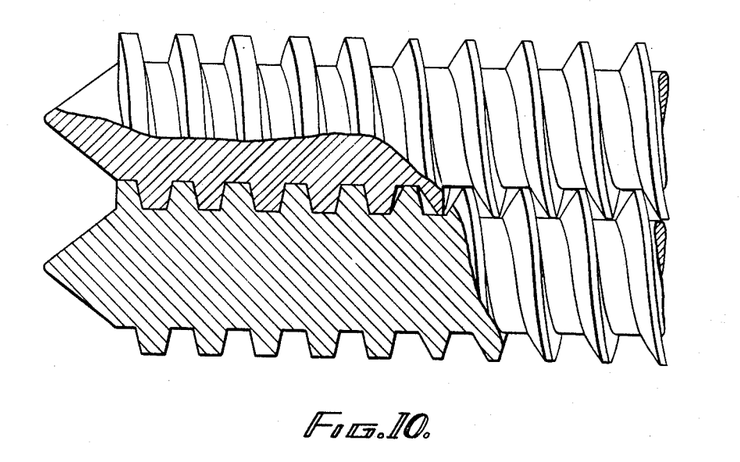
Figure 10 is a plan view on an enlarged scale showing the two output ends of the two screws of Fig. 3 partly in elevation and partly in cross-section.
Figure 11:
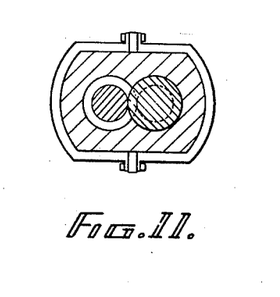
Figure 11 is a transverse cross-section taken along the line XI—XI of Figure 3.

Referring now to Figures 2 and 3 the injection chamber unit comprises a chamber or barrel 13 in which is rotatably mounted a screw conveyor comprising intermeshing twin conveyor screws 10 adapted to be rotated simultaneously in the same direction and to slide longitudinally within said chamber 13. These screws are of a special design, shown best in Figure 10. As clearly shown therein, the threads of the output section of each screw nearly fill the spaces between the threads of the mating screw in the plane containing the axes of the screws, so as to block any possibility of substantial backflow when the screws are being reciprocated as plungers, for reasons which have already been explained. In the specific example illustrated in Figure 10, the root diameter is about 2.05", the exterior diameter about 3.06", and the pitch 1". In the output section axial depth of the exterior surface of the threads is about .30 inch. The leading surfaces of the threads slope toward the root at an angle of 13°. In the inlet section the leading surfaces of the threads are cut back and their angle increased to 31°, so that the axial depth of the outer surface of the threads is reduced to .15". The swept volume of this section is thus increased to about 1½ times that of the outlet section. Since this is less than the compression ratio of any of the thermoplastic materials ordinarily employed, no change of screws or barrel is required when different materials are employed. This is the type of screw shown also in Fig. 3.

The chamber 13 is provided at its outer end with an injection nozzle 16 screwed into a nozzle head 17 which is fixed to the injection chamber by means of bolts 18. Surrounding the injection chamber 13 is a plurality of heater elements 19, preferably consisting of electric resistance heaters, arranged in closely adjacent spaced relationship and connected with a suitable source of electric current by conductor cables 20 (Figure 2). A further electric resistance heater element 19a surrounds the nozzle head 17 in order to ensure that the thermoplastic material, plasticised in the chamber 13, is maintained in a suitable plastic or fluid state as it emerges through the injection nozzle 16 during the injection process. Near the end of the injection chamber 13 opposite the nozzle end is an inlet 21 (Figure 1) for thermoplastic material in powder or granular form which is continuously fed by gravity into the injection chamber 13 through the inlet 21 from a hopper 22. Around the throat of the hopper 22 is a water cooling jacket 23, the purpose of which is to ensure that the thermoplastic material is not converted into a molten or plastic condition by the heat of the heating element 19 adjacent the inlet 21 before it passes into the injection chamber.

The injection chamber 13 is securely clamped to a supporting member 23a (Figure 1) by means of a clamping ring 24, bolts 25 and clamping members 26 by means of which the various clamping elements are drawn tightly together by screw nuts 27. The supporting members 23a are themselves firmly secured to a base member 15 by means of clamping plates 35 as can be clearly seen in Figure 1.

Figure 4:
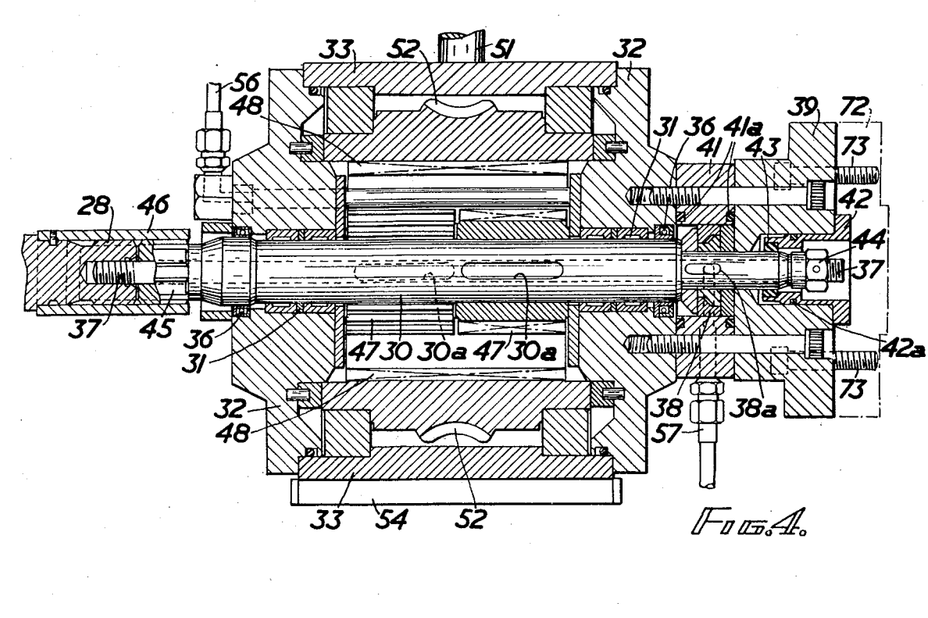
Figure 4 is a vertical section on the line IV—IV of Figure 5 through the gear box drive through which the twin-screw conveyors in the injection chamber are driven by an hydraulic motor.

The inner end of each of the conveyor screws 10 is provided with an integral axial extension 28 which is externally splined and provided with an axial screw threaded bore 29 by means of which said screw conveyor is coupled to a power transmission shaft 30 as shown in Figure 4 and hereinafter more fully described.

Figure 5:
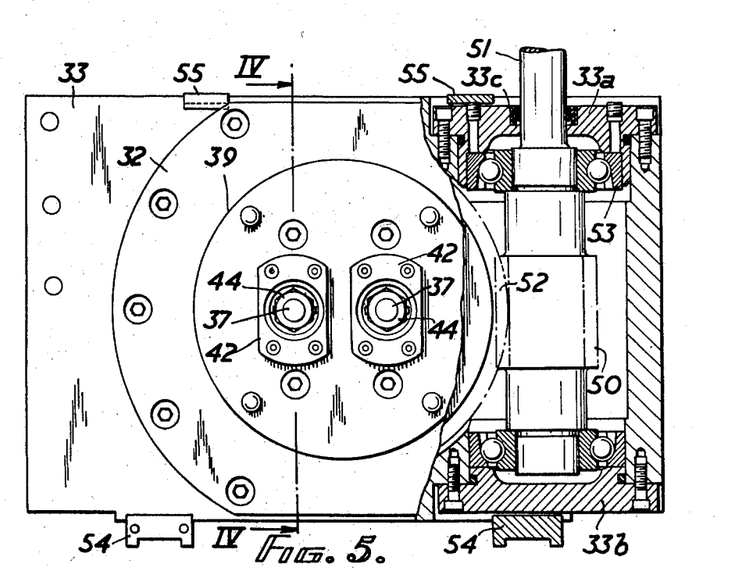
Figure 5 is an end elevation partly in section of Figure 4.

Referring now more particularly to Figures 4 and 5 a power transmission shaft 30 is coupled to each of the conveyor screws 10 and each of the power transmission shafts 30 is mounted in roller bearings 31 in end caps 32 of the gear box 33 of the motor unit which is slidable on a slide bed 34 (Figure 1). At each end of each power transmission shaft 30 a suitable oil sealing ring 36 is provided. Each of the transmission shafts 30 is hollow and through each of said shafts passes a tie rod 37 by means of which each transmission shaft 30 is coupled to one of the conveyor screws 10. A thrust assembly 38 is keyed at 38a to a reduced end portion 30a of the shaft 30, and acts on one end of said shaft 30, said thrust assembly being clamped between the end cap 32 of the gear box and a thrust plate 39 by means of bolts 40 which pass through the thrust plate 39 and a housing 41 surrounding the thrust assembly 38 and screw into tapped holes in said end cap 32. Packing rings 41a are provided in annular grooves formed in the end faces of the housing 41. The end of the tie rod 37 passes through a bore in the thrust plate 39 in which bore is mounted a sealing member 42, an oil sealing ring 43 being arranged between said sealing member and the reduced end of the shaft 30 and a suitable packing ring 42a being arranged between the sealing member 42 and the thrust plate 39. The outer end of the tie rod 37 is externally screw threaded and on this end is screwed a drawn nut 44. The opposite end of the tie rod 37 is also externally screw threaded and adapted to be screwed into the axial tapped bore 29 in the end of the conveyor screw 10 to bring the adjacent ends of the conveyor screw 10 and the power transmission shaft 30 into alignment and abutting engagement. The end of the hollow transmission shaft 30 adjacent to the end of the conveyor screw 10 is provided with an externally splined portion 45 which matches the splined end 28 of the conveyor screw 10 and about these two aligned splined portions 28, 45 is an internally splined sleeve 46. Thus a rigid coupling is formed between the conveyor screw 10 and the power transmission shaft 30.

Keyed to each of the power transmission shafts 30 at 30a is a pinion 47 of transmission gearing through which the shafts 30 are driven. The two pinions 47 on the two transmission shafts 30 are axially displaced relative to each other (see Figures 1 and 4) and one of said pinions meshes with the internal gear teeth 48 of a combined ring and worm gear 49 on one side of said ring and worm gear and the other pinion 47 meshes with the gear teeth 48 on the diametrically opposite side of said ring and worm gear 49. By this arrangement the two conveyor screws are caused to rotate at the same speed in the same direction.

The combined ring and worm gear 49 is driven through a worm 50 formed on a vertical driving shaft 51 of an hydraulic motor 52 (Figure 1) and meshing with worm teeth formed externally around the combined ring and worm gear 49. The driving shaft 51 is mounted in ball bearings 53 in top and bottom bearing retaining plates 33a and 33b mounted in the housing of the gear box 33, the top plate 33a having an oil sealing ring 33c.

The complete motor unit, including the gear box 33 is slidable as a whole on the slide bed 34 (Figure 1) and for this purpose guide rails 54 are mounted on the bottom of the gear box housing and are adapted to slide in corresponding grooves (not shown) formed in the slide bed 34. Guide rails 55 are also provided at the top of the gear box for the same purpose. Suitable oil connecting pipe lines 56 and 57 are provided for supplying lubricant to the gear box and the bearings of the shafts 30 and 51.

Figure 6:
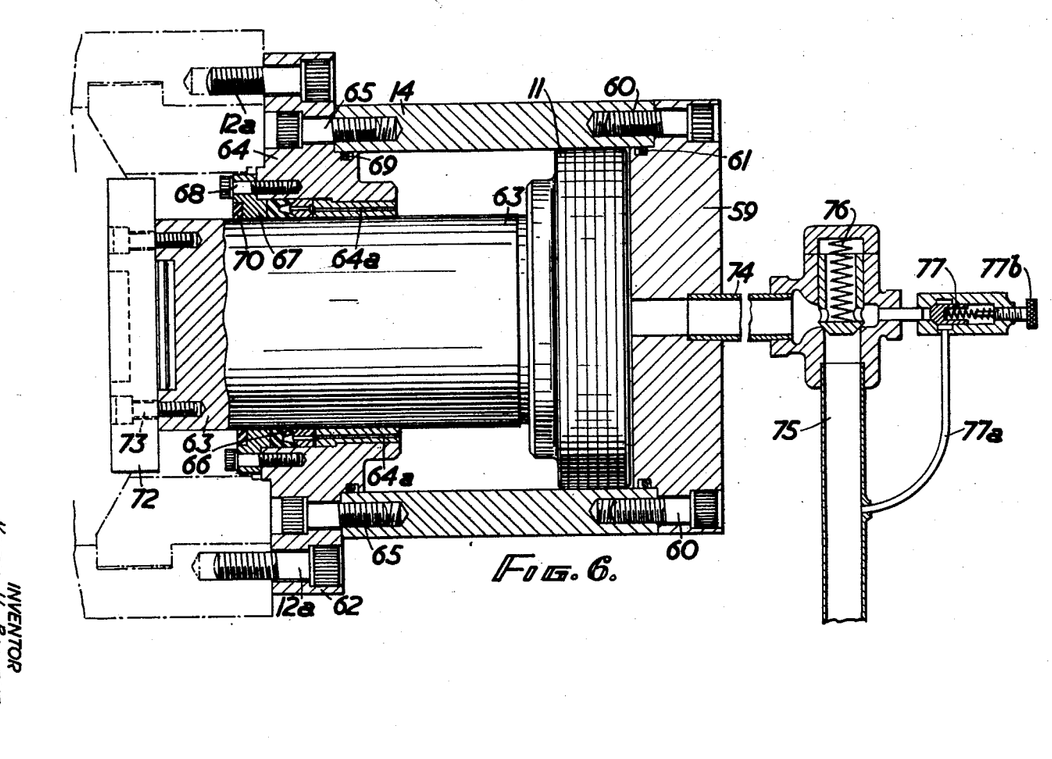
Figure 6 is a vertical section of the hydraulic piston assembly.

Referring now to Figure 6 the hydraulic piston assembly comprises a cylinder 14 having a cylinder head 59 bolted to the cylinder head by bolts 60 with a sealing ring 61 between the cylinder head 59 and the cylinder 14. Slidably mounted within the cylinder 14 is a piston 11 mounted on one end of a piston rod 63 which passes through a flanged annulus 64 which is bolted to the cylinder 14 by means of bolts 65 and which, with the piston rod, closes the opposite end of said cylinder 14. Between the annulus 64 and the piston rod 63 is a lubricating ring 66 held in position by a bushing 64a on one side and a securing ring 67 and screws 68. Sealing rings 69 and 70 are provided between the annulus 64 and the cylinder 14 and the annulus 64 and piston 63 respectively. The cylinder 14 is securely bolted to a part of the frame structure 12 (see also Figure 1) of the machine and a support 23b by bolts 12a which pass through a radial flange 62. To the end of the piston rod 63 opposite to the end carrying the piston 62 an end cap or plate 72 is bolted by bolts 73 and by means of this end cap the piston rod 63 is directly connected to the thrust plate 39 of the slidable motor unit as will be clear from Figure 4.

As will be more clearly described hereinafter the hydraulic cylinder 11 operates to move the motor unit and therewith the screw conveyor 10 longitudinally when the injection chamber 13 is filled with thermoplastic material whereby said screw conveyor operates as a ram to inject the thermoplastic material through the injection nozzle 16 into a mould for moulding the final article.

The piston 11 is actuated by hydraulic pressure fluid fed into the cylinder 14 behind the piston 11 through a central bore 74 which is connected to a source of pressure fluid (not shown) by a pipe line 75. In the pipe line 75 is arranged a spring loaded check valve 76 and a branch pipe 77a connects the pipe line 75 with a second spring loaded check valve 77 provided with an adjusting screw 77b. During the operative or forward stroke of the piston 11 hydraulic pressure fluid is fed into the cylinder through pipe line 75 and the valve 76 while the valve 77 remains closed. During the return stroke of the piston the hydraulic fluid is returned through the valves 76 and 77 and the branch pipe 77a into pipe line 75, the connection between the pipe line 75 and the cylinder being kept closed by the valve 76. As will be understood the arrangement and dimensions of the valve 77b and branch pipe 77a are such that the return of the hydraulic fluid during the return stroke of the piston 11 will be restricted. By this means a predetermined counter pressure is created behind the piston 11 during its return stroke. This counter pressure or resistance to the return stroke of the piston is necessary in order to ensure that the thermoplastic material in the injection chamber is compressed to the desired degree by the screw conveyor which operates, as hereinafter described, to feed the plastic thermoplastic material towards the injection nozzle.

Figure 7:
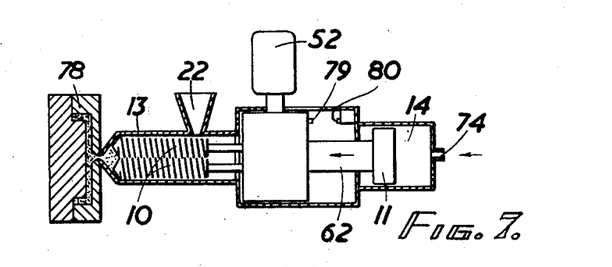
Figures 7 and 8 are diagrammatic sectional views of the complete machine illustrating the sequence of operation.
Figure 8:
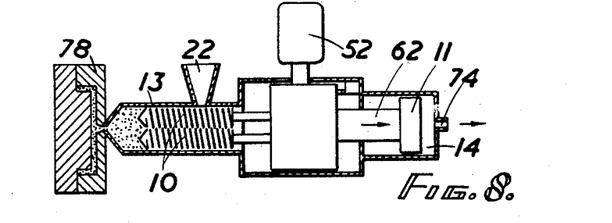

The operation of the machine will now be described with reference to the diagrams shown in Figures 7 and 8 in which Figure 7 shows the parts at the start of an operating cycle and Figure 8 shows the parts just prior to the injection of the thermoplastic material into a mould. Before the machine is started the injection nozzle is closed by a mould 78 to be used for moulding the desired articles and the hopper 22 is filled with thermoplastic material, in powder or granular form, from which the articles are to be moulded. The hydraulic motor 52 is then started, the electric heating element for heating the injection chamber 13 having been switched on previously to bring the chamber to the desired temperature to cause the thermoplastic material therein to be brought into a suitable plastic condition. The motor 52 then drives the twin-screw conveyor 10 which forces the plasticised material in the injection chamber forward towards the injection nozzle 16. The said nozzle being closed by the mould 78 the plastic material is compressed in the front end of the injection chamber by the action of the screw conveyor. When the compression of the plastic material in the front end of the injection chamber reaches a predetermined limit (determined by the counter pressure on the piston 11 during its return stroke, as described with reference to Figure 6) the screw conveyor 10, the motor unit 52 and the piston 11 are forced backward from the position shown in Figure 7 to the position shown in Figure 8. When this latter position is reached a stop 79 engages a limit or contact switch 80 which, through suitable electric connection, operates a solenoid controlled pilot valve whereby the hydraulic power is transferred from the hydraulic motor 52 to the hydraulic piston assembly 11, 14. Thus the motor 52 is stopped, and consequently the screw conveyor 10 ceases to rotate, and the hydraulic pressure forces the piston 11, the motor unit and the screw conveyor 10 forward whereby said screw conveyor acts as a ram to force the plastic material in the injection chamber 13 through the injection nozzle 16 into the mould 78. The parts then remain stationary for a predetermined period to enable the moulded article to cool and to be removed from the mould. This cooling period is controlled by a suitable time switch which, at the end of the predetermined cooling period operates through a solenoid the pilot valve whereby the motor 52 is re-started and the cycle repeated.

Figure 9:
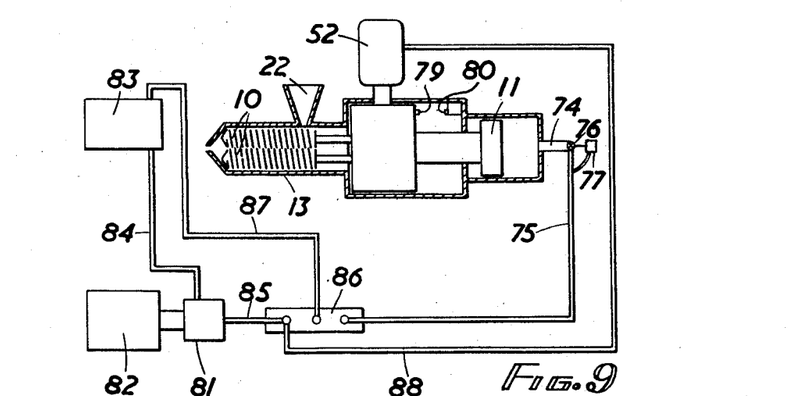
Figure 9 is a diagram illustrating the hydraulic operation of the machine.

The hydraulic control of the machine is illustrated diagrammatically in Figure 9. Referring to this drawing a hydraulic pump 81 is driven by an electric motor or any other prime mover 82 and operates to feed hydraulic fluid from a reservoir 83 through pipe lines 84 and 85 to the hydraulic motor 52 or the piston assembly 11, 14 via a multiway pilot valve 86. The time switch above referred to operates to energise a solenoid to move the pilot valve into a neutral position at the end of the operative stroke of the piston 11 in which position the hydraulic fluid is circulated by the pump 81 in a closed circuit comprising pipe line 85, valve 86, pipe line 87, reservoir 83 and pipe line 84. After a predetermined period the time switch again energises a solenoid which operates to move the pilot valve from its aforesaid neutral position to a position in which hydraulic fluid is fed to the motor 52 through pipe line 88. The motor 52 is thus started and drives the screw conveyor 10 whereby the plastic material is fed to and compressed in the nozzle end of the injection chamber 13. During this period the motor unit and piston 11 are gradually forced back until the stop 79 on the motor unit engages the limit or contact switch 80 which then operates to energise a solenoid which in turn operates the pilot valve 86 to transfer the hydraulic fluid from the motor 52 to the piston assembly 11, 14 through pipe line 75 whereupon the piston 11 is driven forward to cause the screw conveyor 10 to inject the plastic material in the injection chamber 13 into the mould as above described. The aforesaid time switch then again comes into operation whereupon the cycle is repeated.

I claim:

1. An injection moulding machine comprising an elongated injection chamber, means for heating said chamber, a screw conveyor comprising at least two intermeshing conveyor screws rotatable in the same direction and longitudinally slidable within said chamber, the inner surface of said chamber fitting closely about said screws, a plurality of threads at the outlet end of each screw forming a short output section and blocking the space between the adjacent threads of the other screw in the plane of the two screw axes, thereby preventing substantial backflow of thermoplastic material between said screws and enabling them to act as an effective ram when they are moved longitudinally in said barrel, a plasticizing input section longer than said output section, in which the threads on said screws are of the same diameter as those of said input section but the spaces between said threads are larger, a slidably mounted motor unit connected to rotate said conveyor screws, and a hydraulically operated piston connected to said screw conveyor for slidably moving it in said injection chamber, said screw conveyor, motor unit and piston being operatively interconnected and slidable as a unit.

2. An injection moulding machine as claimed in claim 1 in which all of the threads have the same pitch and the axial width of the threads increases gradually from the input end of the input section to the input end of the output section.

3. An injection moulding machine as claimed in claim 2 in which the swept volume of said input section is approximately 1½ times that of said output section.

4. An injection moulding machine as claimed in claim 1 in which said screw conveyor, when rotated and supplied with thermoplastic material, builds up pressure in the output end of said injection chamber and the piston connected to said screw conveyor operates in a hydraulic cylinder, in combination with means actuated by said screw conveyor when the pressure in the output end of said injection chamber drives it back to a predetermined point for admitting pressure fluid to said hydraulic cylinder behind said piston thereby driving said piston and screw conveyor forward to eject thermoplastic material from the output end of said injection chamber.

5. An injection moulding machine according to claim 4, wherein the means for driving the conveyor screws is a hydraulic motor mounted to slide therewith and the hydraulic pressure fluid for driving the hydraulic motor and the piston is supplied by a pump, driven by an electric motor or other prime mover through a pilot valve actuated by a solenoid which retains said pilot valve in position to admit pressure fluid to the motor and cut off pressure fluid from the cylinder of the piston during the feeding and compressing of the thermoplastic material in the injection chamber by the screw conveyor, but is actuated by said screw conveyor to cut off the pressure fluid from the motor and admit pressure fluid to the cylinder of the piston for injecting the compressed thermoplastic material from the injection chamber into the mould when said screw conveyor is forced back to a predetermined point.

6. An injection moulding machine according to claim 5, wherein valve means are arranged in the pipe line for conveying pressure fluid to the cylinder of the piston to restrict the return flow of the pressure fluid whereby a predetermined counter pressure is set up in said cylinder which determines the pressure which must exist in the output end of the injection chamber in order to force said screw conveyor back to said predetermined point against said counter pressure.

7. An injection moulding machine according to claim 6, wherein a stop on the hydraulic motor unit engages a contact switch when the injection chamber is filled with compressed thermoplastic material and the screw conveyor is driven back to said predetermined point and thereby energizes said solenoid to actuate the pilot valve to stop the hydraulic motor and actuate the piston for injecting the thermoplastic into the mould and a time switch is provided which energizes a solenoid to actuate the pilot valve to restart the hydraulic motor when the thermoplastic material has been injected into the mould.

References Cited in the file of this patent

UNITED STATES PATENTS

| | | |
|---|---|---|
| 2,629,132 | Willcox et al. | Feb. 24, 1953 |
| 2,676,355 | Pasquetti | Apr. 27, 1954 |
| 2,734,226 | Willert | Feb. 14, 1956 |

FOREIGN PATENTS

| | | |
|---|---|---|
| 903,086 | France | Jan. 5, 1945 |